(12) United States Patent
Thubert et al.

(10) Patent No.: US 11,463,916 B2
(45) Date of Patent: Oct. 4, 2022

(54) RELIABLE AND AVAILABLE WIRELESS FORWARDING INFORMATION BASE (FIB) OPTIMIZATION

(71) Applicant: Cisco Technology, Inc., San Jose, CA (US)

(72) Inventors: Pascal Thubert, Roquefort-les-Pins (FR); Arman Rezaee, Des Moines, WA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 17/145,201

(22) Filed: Jan. 8, 2021

(65) Prior Publication Data
US 2022/0225171 A1    Jul. 14, 2022

(51) Int. Cl.
H04W 28/18    (2009.01)

(52) U.S. Cl.
CPC .................. *H04W 28/18* (2013.01)

(58) Field of Classification Search
CPC ..... H04L 47/24; H04L 41/12; H04L 41/0668; H04L 45/28
See application file for complete search history.

(56) References Cited

U.S. PATENT DOCUMENTS

| | | | |
|---|---|---|---|
| 9,923,798 B1 | 3/2018 | Bahadur et al. | |
| 2006/0039364 A1* | 2/2006 | Wright | H04M 3/2263 370/352 |
| 2012/0106358 A1* | 5/2012 | Mishra | H04L 43/00 370/242 |
| 2014/0269266 A1* | 9/2014 | Filsfils | H04L 43/50 370/228 |
| 2014/0313886 A1 | 10/2014 | Yuan et al. | |
| 2015/0195178 A1* | 7/2015 | Bhattacharya | H04L 41/342 718/1 |
| 2015/0200838 A1 | 7/2015 | Nadeau et al. | |

(Continued)

FOREIGN PATENT DOCUMENTS

EP    1262042 A2    12/2002

OTHER PUBLICATIONS

Ventre, Pier Luigi, et al., "Segment routing: a comprehensive survey of research activities, standardization efforts and implementation results"; arXiv.org, Jul. 3, 2020.

(Continued)

*Primary Examiner* — Syed Ali
(74) *Attorney, Agent, or Firm* — Merchant & Gould P.C.

(57) ABSTRACT

Optimal determination of wireless network pathway configurations may be provided. A computing device may receive an error profile and a response instruction associated with the error profile, as generated by a network controller. The computing device may then monitor, for an error, on a communication Track, in a network, between an ingress node and an egress node. Then, the computing device, upon detecting the error, can determine that the error is similar to the error profile, and based on the determination that the error is similar to the error profile, enact the response instruction. The response instruction can direct the computing device to switch from the communication Track to a communication subTrack between the ingress node and the egress node.

13 Claims, 7 Drawing Sheets

(56) References Cited

U.S. PATENT DOCUMENTS

| | | | |
|---|---|---|---|
| 2016/0050131 A1* | 2/2016 | Zhang | H04L 43/20 370/244 |
| 2018/0077051 A1* | 3/2018 | Nainar | H04L 45/28 |
| 2021/0083967 A1* | 3/2021 | Joshi | H04L 45/64 |
| 2021/0297351 A1* | 9/2021 | Vegesna | H04L 47/12 |

OTHER PUBLICATIONS

Bashandy, A., et al., "Topology independent fast reroute using segment routing"; IETF, Mar. 30, 2018.

International Search Report and Written Opinion issued in corresponding International Patent Application No. PCT/US2021/065027, dated Apr. 19, 2022.

Snoeren, Alex C., et al.; "Fine-Grained Failover Using Connection Migration"; Proc. of the Third Annual USENIX Symposium on Internet Technologies and Systems (USITS), Mar. 2001 (An earlier version appeared as MIT Laboratory for Computer Science Technical Report, MIT-LCS-TR-812.) (12 pages).

Andersen, David et al.; "Resilient Overlay Networks" 19th ACM Symp on Operating Systems Principles (SOSP) Oct. 2001, Banff, Canada (15 pages).

Andersen, David G. et al.; "RON: Choosing Resiliency" MIT Laboratory for Computer Science; Oct. 2002; http://nms.lcs.mit.edu/ron/ (29 pages).

Andersen, David et al.; "Topology Inference from BGP Routing Dynamics" MIT Laboratory for Computer Science; Oct. 2002; http://nms.lcs.mit.edu/ron/ (23 pages).

Andersen, David G. et al.; "The Case for Resilient Overlay Networks" MIT Laboratory for Computer Science; May 2001; http://nms.lcs.mit.edu/ron/ (24 pages).

Andersen, David G. "Resilient Overlay Networks"; MS Thesis; MIT Dept. of Electrical Engineering and Computer Science, May 16, 2001.

Jung, Jaeyeon, E. Sit, H. Balakrishnan and R. Morris, "DNS performance and the effectiveness of caching," in IEEE/ACM Transactions on Networking, vol. 10, No. 5, pp. 589-603, Oct. 2002, doi: 10 1109/TNET.2002.803905.

Anderson, David G.; Feamster, Nick; Bauer, Steve; and Balakrishnan, Hari, "Topology Inference from BGP Routing Dynamics" (2002). Computer Science Department. Paper 85. http://repository.cmu.edu/compsci/85.

Feamster, Nick et al.; "Measuring the Effects of Internet Path Faults on Reactive Routing"; ACM SIGMETRICS Performance Evaluation Review; vol. 31, Issue 1; Jun. 2003 pp. 126-137; https://doi.org/10.1145/885651.781043.

Sontag, David et al. "Scaling All-Pairs Overlay Routing" CoNEXT '09: Proceedings of the 5th international conference on Emerging networking experiments and technologies; Dec. 2009 pp. 145-156; https://doi.org/10.1145/1658939.1658956.

Raszuk, R. et al. "IP Traffic Engineering Architecture with Network Programming draft-raszuk-teas-ip-te-np-00" https://www.ietf.org/archive/id/draft-raszuk-teas-ip-te-np-00.txt; Oct. 2, 2019 (22 pages).

* cited by examiner

RELIABLE AND AVAILABLE WIRELESS FORWARDING INFORMATION BASE (FIB) OPTIMIZATION

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs (also referred to as nodes) may also work in coordination, either through direct wired or wireless connections, or through a central system, which may be a Wireless Local Area Network (WLAN) controller (WLC), a Wide Area Network (WAN) controller, or other type of network controller.

Several nodes or other devices can form a wireless network or wireless mesh. The network can transfer data from one client device to another client device through two or more nodes or other devices. The networks can suffer from issues that cause less than ideal service, e.g., jitter and data loss. Often, the controller cannot effectively manage these network issues because the controller must oversee a very large number of devices in the network, and thus, the response time from the controller is too slow. Thus, the networks fail to perform at the best service levels when the network is facing issues, either from external factors or from problems with one or more devices or connections within the network.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Figure 1A:
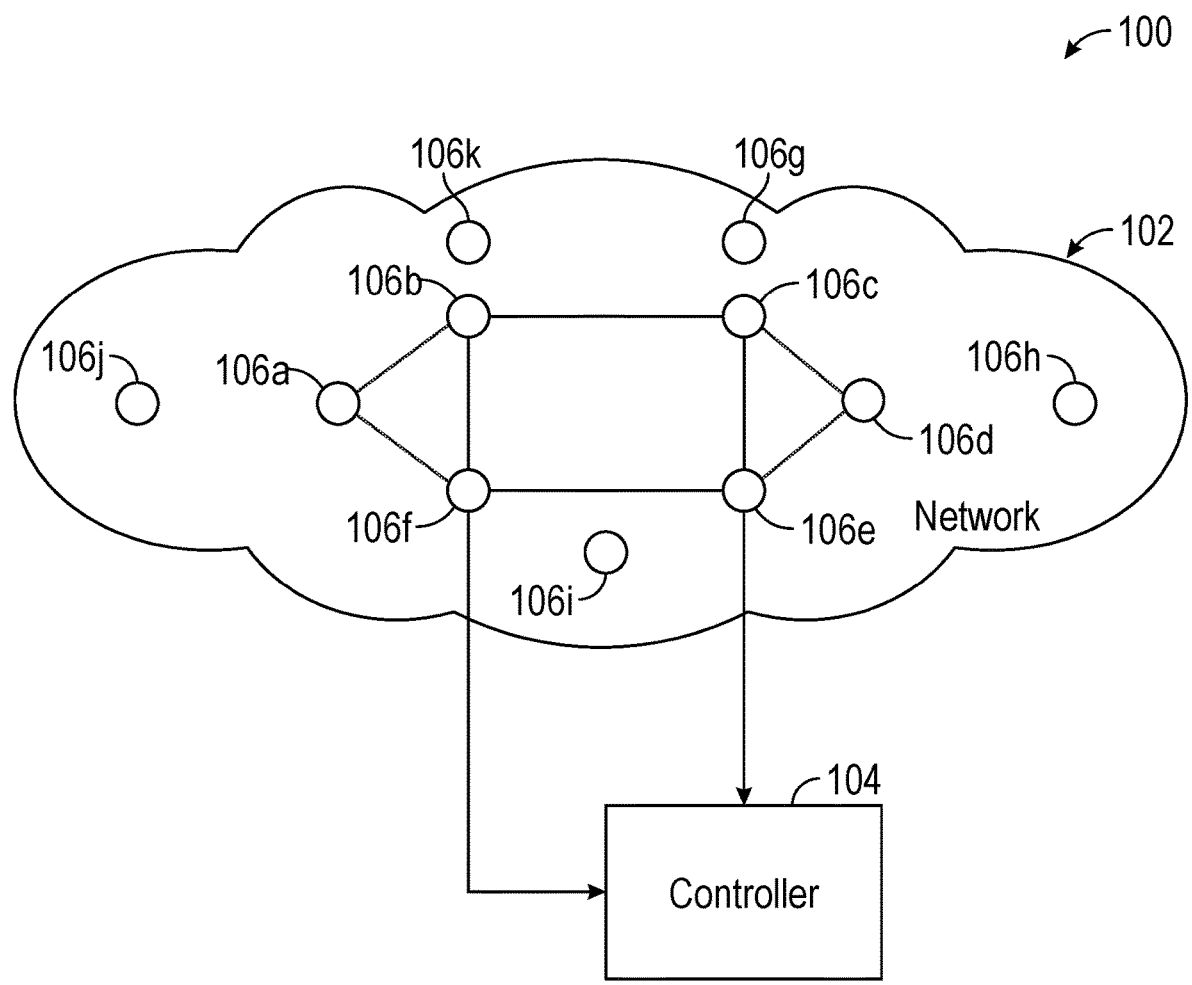
FIG. 1A is a block diagram of a wireless network environment in accordance with aspects of the present disclosure.

Optimal determination of wireless network pathway configurations may be provided. A computing device may receive an error profile and a response instruction associated with the error profile, as generated by a network controller. The computing device may then monitor for an error on a communication Track, in a network, between an ingress node and an egress node. Then, the computing device, upon detecting the error, can determine that the error is similar to the error profile, and based on the determination that the error is similar to the error profile, enact the response instruction. The response instruction can direct the computing device to switch from a first subTrack currently in use to a second subTrack between the ingress node and the egress node.

Both the foregoing overview and the following example are examples and explanatory only, and should not be considered to restrict the disclosure's scope, as described and claimed. Furthermore, features and/or variations may be provided in addition to those described. For example, example of the disclosure may be directed to various feature combinations and sub-combinations described in the example.

Example

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Reliable and Available Wireless (RAW), being developed by the Internet Engineering Task Force (IETF). RAW aims at bringing more determinism to Wi-Fi. Bringing determinism in a packet network means eliminating the effects of multiplexing that result in probabilistic jitter and loss. Wireless signals propagate through a shared medium where uncontrolled interferences, including, for example, self-induced multipath fading. RAW tries to address issues in Wi-Fi by leveraging diversity in the spatial, time, code, and frequency domains, and can provide a guaranteed Service Level Agreement (SLA) while preserving energy and optimizing the use of the shared spectrum.

RAW can apply Deterministic Networking (DetNet) concepts to provide high reliability and availability for an Internet Protocol (IP) network that utilizes wireless segments, e.g., Institute of Electrical and Electronics Engineers (IEEE) Std. 802.15.4 time slotted channel hopping (TSCH), 3rd Generation Partnership Project (3GPP) 5G Ultra-Reliable Low Latency Communications (URLLC), IEEE 802.11ax/be, and L-band Digital Aeronautical Communications System (LDACS), etc. Similar to DetNet, RAW may stay agnostic to the radio layer but include the capability to schedule time/frequency resources to enable diversity in the network.

In contrast with wired networks, errors in transmission are the predominant source of packet loss in wireless networks. In a Wi-Fi environment that is filled with metallic structures and mobile objects, a single radio link may provide a fuzzy service, meaning that the single link cannot always be relied upon to transport the network traffic reliably over a long period of time. Transmission losses are often not independent, and their nature and duration are unpredictable; as long as a physical object (e.g., a metallic trolley between node peers) that affects the transmission is not removed, or as long as the interferer (e.g., a radar) keeps transmitting. A continuous stream of packets can often be affected and can fail to meet an SLA due to several data losses in a row.

The most efficient method to combat those unpredictable losses may be network diversity. Different forms of network diversity can combat different causes of loss, and the use of network diversity can help maximize or optimize the Packet Delivery Ratio (PDR) within the SLA. A single packet may be sent at different times (time diversity) over diverse paths (spatial diversity) that rely on diverse radio channels (frequency diversity) and diverse Physical (PHY) technologies, e.g., narrowband vs. spread spectrum, or diverse codes. Using time diversity can address short-term interferences; spatial diversity can mitigate very local causes of interference or errors, such as multipath fading. Likewise, narrowband and spread spectrum changes may be relatively innocuous to one another and can be used for diversity.

RAW can address end-to-end protection in a wireless mesh. To address end-to-end protection, RAW defines the concept of a "Track", as a traffic engineered path with wireless segments. A simple Track can be composed of a direct sequence of reserved hops to ensure the transmission of a single packet from a source Node (e.g., an AP) to a destination Node (e.g., an AP) across a multi-hop path (e.g., comprising one or more intermediary devices). A Complex Track may be designed as a directed acyclic graph towards a destination Node to support multi-path forwarding. For RAW, the controller (referred to as a Path Computation Element (PCE)) can define a complex Track between an Ingress End System and an Egress End System and may indicate to the RAW Nodes where the Packet Replication and Elimination (PRE) functions may be actioned in the Network Plane. Packets from the same or a different flow that are routed through the same Track will not necessarily traverse the same links (e.g., the connections between particular nodes in the network).

As opposed to wired networks, the action of installing a Track over a set of wireless links may be very slow relative to the speed at which the radio link conditions vary, and thus, for the wireless case, the PCE can provide extra redundant forwarding solutions to anticipate changes that may be required in the network. To provide the guaranteed SLA while minimizing the waste of spectrum and battery, RAW can select a subTrack for packet forwarding.

In aspects of this disclosure, the RAW forwarding operation along the Track can be encoded by indicating the subTrack in a Segment Routing (SRv6) Service Instruction. The encoding can be optimized for Forwarding Information Base (FIB)-based forwarding. When the PCE computes the Track, the PCE may also compute a collection of preferred subTracks that may be possible combinations of other serial paths in the Track. Each subTrack may combine one or more of the end-to-end serial paths between the ingress and egress devices. The redundancy provided from the subTracks can help address errors when a given link fails or is suffering data loss or a given node fails.

For example, an example network may include several nodes. A first subTrack "0001" can include links between nodes A through H, e.g., links A→B, B→D, D→F, F→H, which can comprise one serial path. This first serial path may be non-congruent with a second serial path, e.g., with links A→C, C→E, E→G, G→H. These 2 subTracks may be orthogonal in that an error that affects one serial path does not affect the other serial path. Aspects herein can allocate a bit in a bitmap, e.g., "0001", to represent one of the serial paths, e.g., path with links A→B, B→D, D→F, F→H. The bitmap 0001 can represent the subTrack having the serial path. Traffic Engineering (TE) in the network can react to the loss of one end-to-end path by enabling another path. However, TE may not provide redundancy when there is a fuzzy radio link that may randomly lose a few packets for a split second and then come back.

SubTracks can be employed to solve a breakage that involves any combination of broken segments. Further, subTracks can be employed together, where one node can become a replication point and another node can become an elimination point. In some implementations, a node can identify the subTrack, using a bitwise AND to indicate that a combination of segments.

The controller can associate that subTrack to an error profile. When that error profile is observed, a node can automatically select a subTrack that protects against the error profile. The controller can encode the possible failures as a failure profile, and the controller can then map the subTrack with the encoded failure profile that the subTrack protects against. For instance, each hop in a Track can be encoded as 2 bits, one indicating that the link is misbehaving and the other indicating transient vs. permanent error.

In an implementation, the controller can associate subTrack 0001 to all the situations where the nodes are operating well. In contrast, the controller can also identify a different subTrack in the situations where one or more segments or links are broken, and there are transient errors on other links or segments. The controller can then select a set of subTracks that can provide a maximum protection and can then push the selection of the subTrack to the nodes along the Track to install in a FIB or use otherwise.

The subTrack that is fully congruent with the whole Track is the subTrack that recovers the largest error profile, but at the same time is the one that may cost the most energy and spectrum. In at least some implementations, the controller can order the subTracks by cost, in terms of, for example, energy and spectrum. For a given observed error profile, a node may select the subTrack that has the least cost. When using SRv6, a prefix may be associated to the destination of the Track.

The Track ingress node can encapsulate the packets in IP and can set the destination address. The prefix designates the destination as per SRv6, e.g., 2001:db8:DE5:148, and is advertised by that destination as an aggregation in the Interior Gateway Protocol (IGP). The next bits can indicate the Track, so multiple Tracks may lead to a same destination node, in the source routed mode, the Security Identifier (SID) placed in the Interface Identifier (IID) contains the subTrack bitmap. In a distributed mode, the SID may signal the error profile e.g., 2001:db8:DE5:5::/64 denotes locally significant Track ID 5 to node 2001:db8:DE5::/48, and 2001:db8:DE5:5::3 denotes subTrack 0011 in that Track when using source routing.

At each node inside the Track, the PCE can install a state in FIB that indicates the possible next hops for that Track (e.g., longest match for 2001:db8:DE5:5::/64). For each node, each bit in the subTrack encoding may correspond to a copy data to one of the Track next hops as programmed in FIB. For example, the bit 0001 in the SID means "copy to D" in node B, and "copy to F" in node D, whereas 0010 means "copy to D" in node B, and "copy to E" in node D. When both bits are set, e.g., "0011", B may have a single coalesced action "copy to D" whereas D needs to do "copy to E" and "copy to F", which is a replication action.

Based on the RAW Operation, Administration, and Maintenance (OAM) a node can indicate and may report to another node the state of rest of the way within the Track. The node(s) (can be the ingress node only or can be distributed amongst the nodes) may determine the failure profile and can select a subTrack. In the source routed mode, the Track determination can occur at the ingress node only, and the subTrack is encoded as a service instruction in the SID placed in the IPv6 IID of the destination IPv6 address. In the distributed mode, each node in the Track can operate as a Pathway Segment Element (PSE) that can determine the subTrack for the next packets for the rest of the way to the destination, and may write the bitmap in a registry that is accessible to the forwarding engine. The bitmap can serve as a subTrack indication for the next packets to come, until the subTrack is updated.

As a result, the forwarding decision, instead of being, for example, a hash and Equal Cost Multi-Path (ECMP), may be based on the subTrack bitmap. Thus, the forwarding can be adapted dynamically not by changing the FIB entries for the Track but by changing the bits that indicate which of the Track possible next hops in FIB may be used at this time.

A wireless environment 100 may be as shown in FIG. 1. The wireless environment 100 can include a wireless local area network 102 (referred to as network 102, WLAN 102, or wireless network 102), which can include two or more nodes 106, also referred to as network nodes 106. The network nodes 106 may include one or more APs and/or other devices. The network 102 can be controlled by a controller 104, e.g., a Wireless Local Area Network (WLAN) controller (WLC), a network controller, etc. The AP node 106, or other devices, and the controller 104 may be computer systems or other devices as described in conjunction with FIGS. 5A and 5B.

The one or more nodes 106 may form a wireless network 102, for example, a wireless mesh network. The wireless network 102 may be composed of two or more nodes 106. The nodes 106 can join and/or communicate together to form one or more Tracks or subTracks, which are pathways in the network 102 that are capable of communicating data from one client to another. These Tracks may be formed by one or more links between the nodes 106, as may be shown in FIGS. 1A-1D. For example, an ingress node 106a may communicate information or data to an egress node 106d from one client, communicating with the ingress node 106a, to another client, communicating with the egress node 106d. However, node 106a may not be able to communicate directly with node 106d. As such, the node 106a may form one or more Tracks or subTracks to communicate data between one or more intermediary nodes, e.g., 106b, 106c, 106f, and 106e, between node 106a and 106d. For example, there may be a Track segment from node 106a to node 106b, then to node 106c, and finally to node 106d. These Track segments may be changed. Other different subTracks can include different nodes 106, for example, node 106f or node 106e. Changes to the subTrack may occur in response to one or more errors 108 contained in the main, default Track (or current subTrack) between node 106a and 106d.

The WLAN may be controlled by a controller 104, e.g., a WLC. The controller 104 can communicate with the one or more nodes within the WLAN 102. The controller 104 can receive information about link errors 108 from the one or more nodes 106. Further, the controller 14 can determine statistically how often or how these different errors 108 may affect the WLAN 102. Based on the statistical analysis, the controller 104 can create one or more error profiles and/or responses to the various types of errors 108 that may be encountered in the wireless network 102. These different responses may then be pushed to the one or more nodes 106 for the nodes 106 to respond, in near real-time, to these types of errors 108. It should be noted that the controller 104 may not be able to respond quickly enough to such errors 108 because of the numerous different nodes 106 that may be controlled by the controller 104. Thus, the controller 104 may not be capable of responding, in time, to adjust to different changes or errors 108 in the network 102.

Figure 1B:
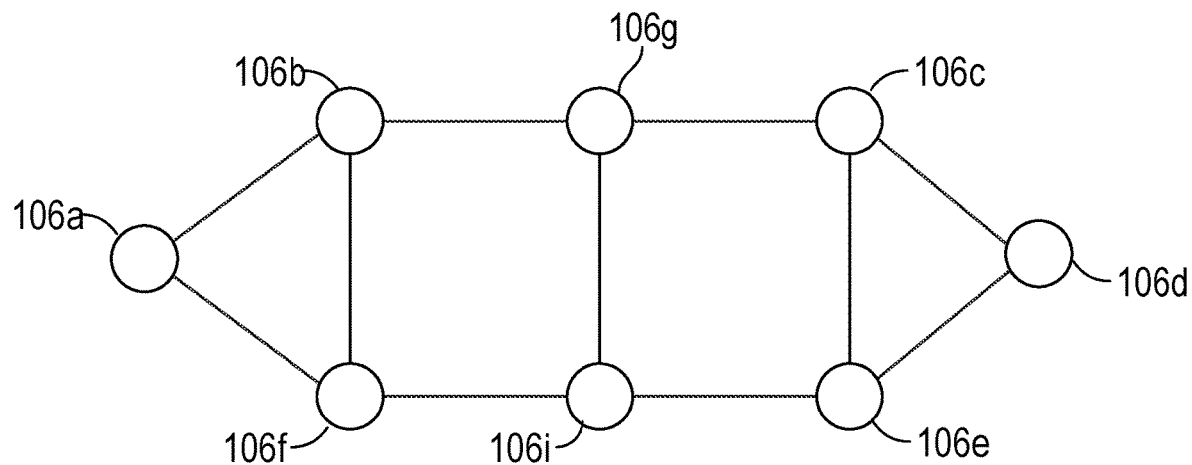
FIG. 1B is another block diagram of a wireless network environment in accordance with aspects of the present disclosure.
Figure 1C:
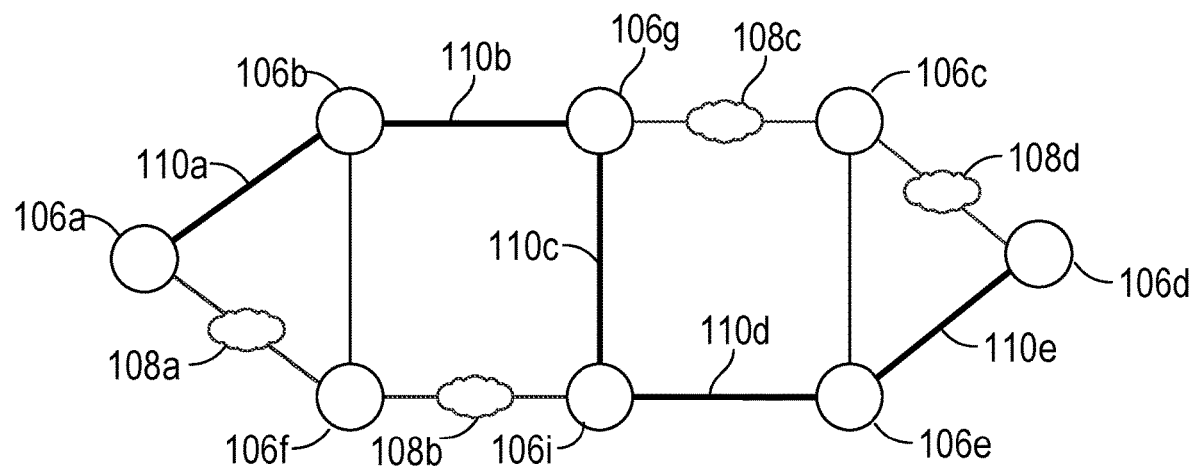
FIG. 1C is another block diagram of a wireless network environment in accordance with aspects of the present disclosure.
Figure 1D:
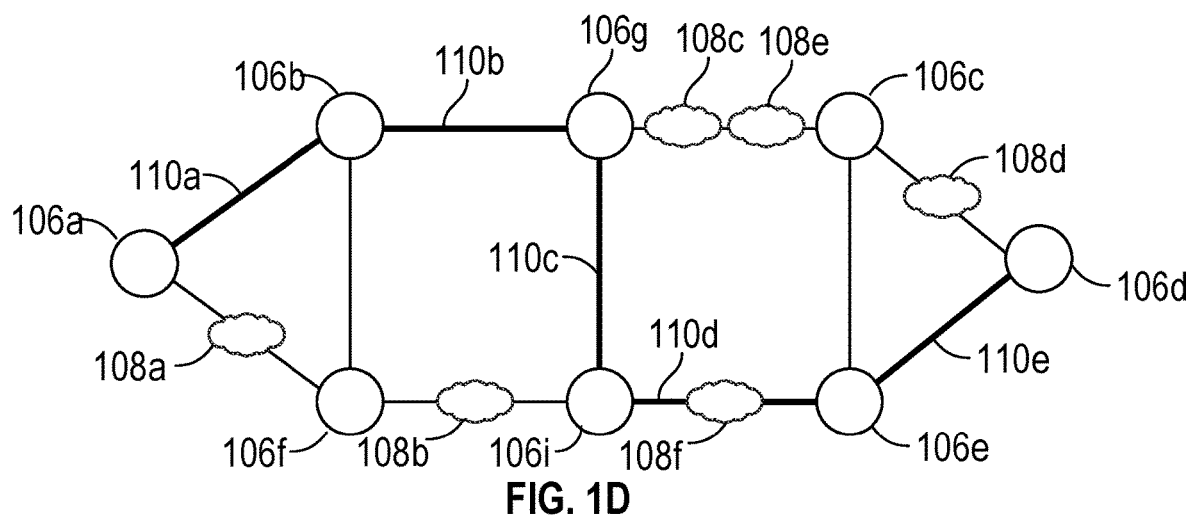
FIG. 1D is another block diagram of a wireless network environment in accordance with aspects of the present disclosure.

Various types of Tracks and subTracks that may be implemented by the wireless network 102 may be as shown in FIGS. 1B through 1D. The nodes 106a-106i may configure links, for example, 110a-110e to avoid errors 108a-108e. Representations of one or more Tracks/subTracks may be implemented between an ingress node 106a and an egress node 106b may be as shown in FIGS. 1B-1D. In the different configurations, nodes 106b, 106c, 106e, 106f, 106g, and/or 106i may be able to relay information between nodes 106a and 106d. The main Track may be from nodes 106a, to 106b, to 106g, to 106c, and then to 106d. This main/default Track may be changed based on errors 108 that may occur in one or more of the links within the various segments/nodes in the network 102.

In an example, there may be one or more errors 108 occurring in one or more nodes 106 or link segments between the nodes 106. These errors 108 may make communication between the nodes 106 difficult or impossible, or may affect data quality or service quality. Regardless, the errors may require a rerouting of the data traffic between the nodes 106 of the network 102, as shown in FIG. 1C. For example, node 106a may send data to node 106b over link 110a. Likewise, node 106b may send data to node 106g over link 110b. However, node 106g may not be able to send data to node 106c based on error 108c. Further, another error, 108d, may cause related problems between node 106a and node 106f; error 108b may cause problems between nodes 106f and 106i. Node 106g may not route data to node 106c but may change to a different subTrack 110c/110d to relay information to node 106i instead. Node 106i may then make a link 110d to node 106e, which may make link 110e to the egress node 106d. In this way, an alternative routing between nodes 106a and 106d is implemented based on the errors 108.

These changes may occur, based on a direction or directive from the controller 104 (also referred to as a PCE 104). The controller 104 may indicate, based on the error 108, that the nodes 106 may use a different subTrack, for example, link 110c through 110d, to reroute traffic to node 106. However, the nodes 106 may make the changes rather than the controller 104 because of the transient and rather short-lived occurrence of most errors 108.

Another implementation of the rerouting may be as provided in FIG. 1D. In this configuration, there may still be errors 108 on the subTrack, as represented by error 108f. This error 108f may be less severe or less costly to the Quality Of Service (QoS) than the errors 108C through 108E occurring in the segments between nodes 106g, 106c, and 106d. As such, the rerouting, as described above in conjunction with FIG. 1C, may still occur, based on the different errors 108 that are occurring in the several nodes 106 within this wireless network 102.

Node-specific policies may be provisioned by a controller 104, e.g., a WLC, for the plurality of nodes 106 to manage the wireless network 102. Consistent with examples of the disclosure, one or more node(s) 106 or the WLC 104 may configure the Tracks/subTracks of two or more nodes 106 to a determined segment/link/Track configuration.

As stated above and as shown in FIG. 1A, wireless network 102 may comprise Wi-Fi nodes (e.g., first node 106a and/or second node 106b) that may be configured to support a wireless (e.g., Wi-Fi) network 102. The nodes 106 may comprise a physical location where a user, operating client device, may obtain access to wireless network 102 (e.g., Internet access), using Wi-Fi technology, via a WLAN using a router connected to a service provider.

In other example of the disclosure, rather than nodes, devices may be used that may be connected to a cellular network that may communicate directly and wirelessly with end use devices (e.g., client device) to provide access to wireless network 102 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client devices (not shown) may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of the wireless network 102 (e.g., WLC 104, first node 106a, second node 106b, or other nodes 106, etc.) may be practiced in hardware, in software (including firmware, resident software, microcode, etc.), in a combination of hardware and software, or in any other circuits or systems. The elements of wireless network 102 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 102 may also be practiced using other technologies capable of performing logical operations such as, for example, AND, OR, and NOT, including but not limited to, mechanical, optical, fluidic, and quantum technologies. As described in greater detail below with respect to FIGS. 5A and 5B, the elements of wireless network 102 may be practiced in a computing device 500.

Figure 2A:
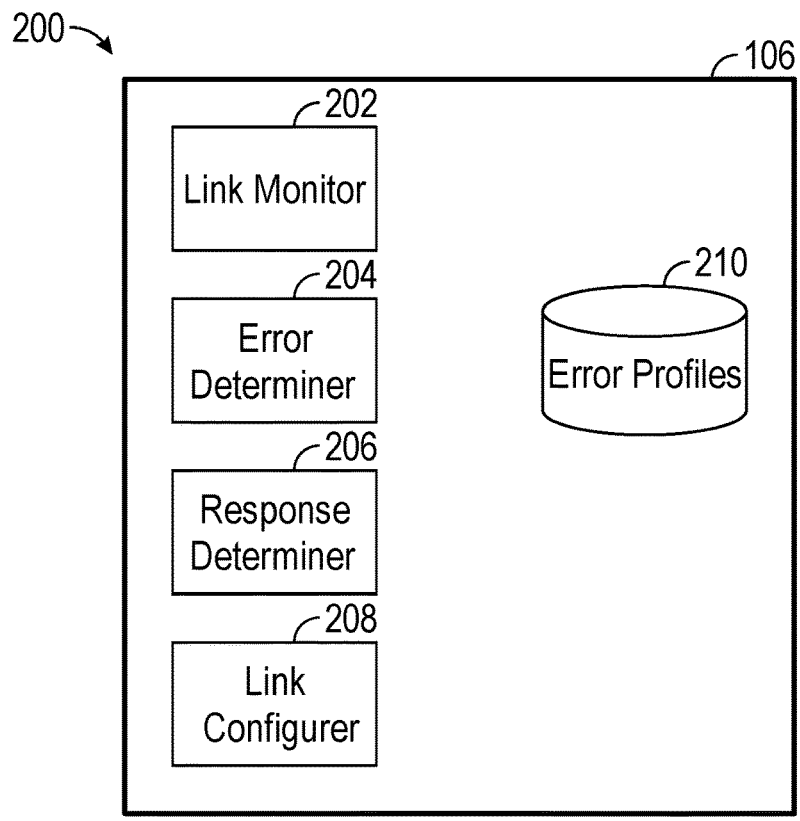
FIG. 2A is a block diagram of an AP or other network node device in accordance with aspects of the present disclosure.
Figure 2B:
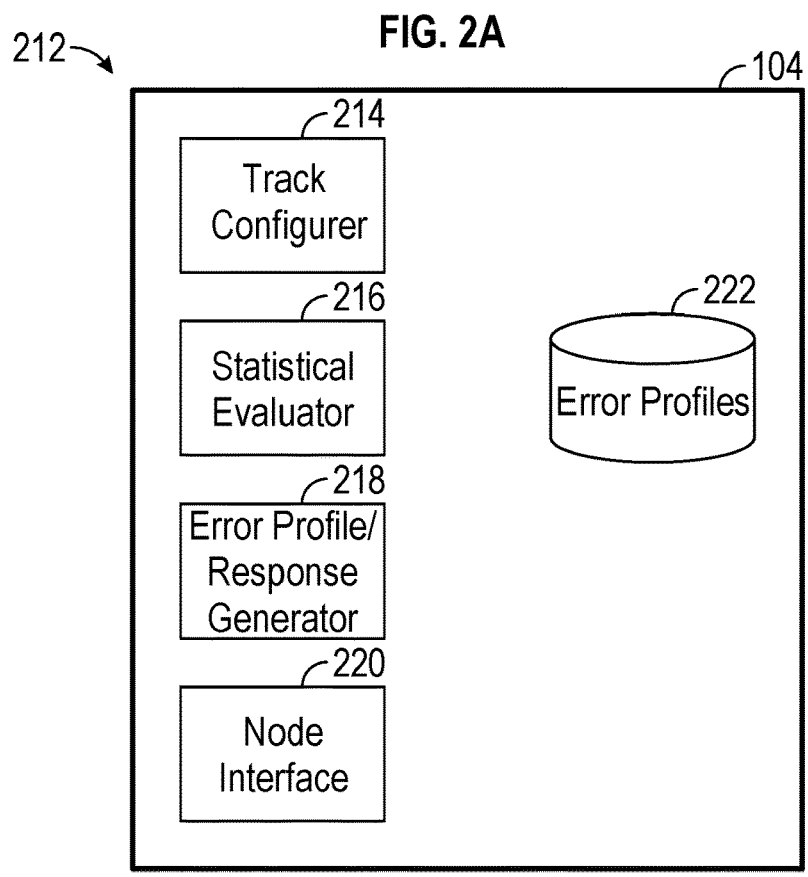
FIG. 2B is a block diagram of a controller in accordance with aspects of the present disclosure.

An implementation of the different hardware, software, or combination of hardware software 200 for the node 106 and/or 212 for the controller 104 may be as shown in FIGS. 2A and 2B. The node 106 may include one or more of, but is not limited to, a link monitor 202, an error determiner 204, a response determiner 206, a link configurer 208, and/or one or more error profiles 210. The link monitor 202 can monitor links 110 from or to the node 106 from one or more other nodes 106. For example, the link monitor 202 may monitor errors 108 or issues with links 110b from, for example, a node 106b to node 106g or a link segment 110 from node 106g to node 106c. A central node or controller node, e.g., node 106a, or each node 106 separately can determine if one or more errors 108 are occurring, for example, errors 108c or 108e. Further, link monitor 202 can provide the error information about the link 110 to an error determiner 204, either at the same node 106 or to the central node 106a.

The error determiner 204 can determine what type of error(s) 108 are being witnessed or monitored by the link monitor 202. The error determiner 204 can determine what type of error 108 is being witnessed, based on QoS indicators, data loss, or other types of information. Further, the error determiner 204 may, in some implementations, direct or conduct one or more tests of the link 110. These tests may further define what is occurring in the network 102 or what is being witnessed by the node 106 on one or more Track or subTrack segments. Once the error 108 is determined, the error information may be sent to the response determiner 206.

The response determiner 206 may receive the error information from error determiner 204 and then determine how to respond to such an error 108. In at least some implementations, the response determiner 206 can access error profiles, in the error profile data store 210, which may have the same or similar error characteristics to the situation with the error information, as was provided by the error determiner 204. Thus, a response determiner 26 can match the error data, from the error determiner 204, to one or more types of error profiles, in the error profile data structure 210. Based on the match or based on a statistically significant similarity to an error profile 210, the response determiner 206 can read or extract the response instructions, in the error profile 210, as provided by the controller 104. Response determiner 206 may then provide this information about how to respond to the link configurer 208.

The link configurer 208 may change the different links from or to the node 106 to use a different subTrack or path within the network 102. For example, with node 106g, the link configurer 208 may change from the link 110 between nodes 106g and 106c to the link 110c between node 106g and node 106i. Thus, the link configurer 208 can make any kind of changes to the hardware or software required to reroute data to or from the node 106, based on the response provided by response determiner 206.

The controller 104 may contain one or more of, but is not limited to, a Track configurer 214, a statistical evaluator 216, an error profile/response generator 218, a node interface 220, and/or an error profile data structure 222. The Track configurer 214 can configure one or more Tracks for the one or more nodes 106. The Track configurer 214 can determine a default or best Track between an ingress node 106a and egress node 106d. For example, the Track configurer 214 can determine that the best Track or default Track would be between nodes 106a, 106b, 106g, 106c, and 106d. This Track may be provided by the Track configurer 214 of the controller 104 to the one or more nodes 106a through 106i, to establish the Track for data between clients connecting with nodes 106a and 106d. Thus, for each of the one or more different communication pathways within the network 102, the Track configurer 214 can provide the Track that will be used to communicate data.

A statistical evaluator 216 can receive information from one or more nodes 106 that may document or record different types of performance or error characteristics. This error information may then be evaluated by the statistical evaluator 216 and may produce one or more statistical models or statistical information from the information received from the nodes 106. For example, the statistical evaluator 216 can determine which type of errors 108 may occur in different types of links, how often the errors 108 occur, what resulted from those errors 108, and what may be the proper response or responses that have been used to address the errors 108. The statistical information may then be provided to the error profile/response generator 218.

The error profile/response generator 218 may then generate one or more different types of error profiles based on the statistical information received from the statistical evaluator 216. This error profile information can include an identity of the links/segments, what type errors 108 are experienced, the responses attempted to resolve the errors 108, and other types of information. An example of an error profile may be as presented in FIG. 4. The error profile may also include a response or what type of response were used previously. The error profile and response information may include other types of information as provided in the data structure 400 in FIG. 4. These different error profile and response combinations may be stored in error profiles 222. Thus, for all nodes 106 or links within the network 102, there may be error profiles or error profile and response combinations stored in the data store 222. Thus, the error profiles saved in the nodes 106, in data store 210, may be a portion of the error profiles stored within the controller 104, in error profile data structure 222.

Node interface 220 may interact with one or more nodes 106. The node interface 220 can send the nodes 106 node-specific error profiles to be stored in the profile data structure 210. The node interface 220, thus, can provide the type of data required by the nodes 106 to make changes to the subTracks used for transmitting data.

Figure 4:
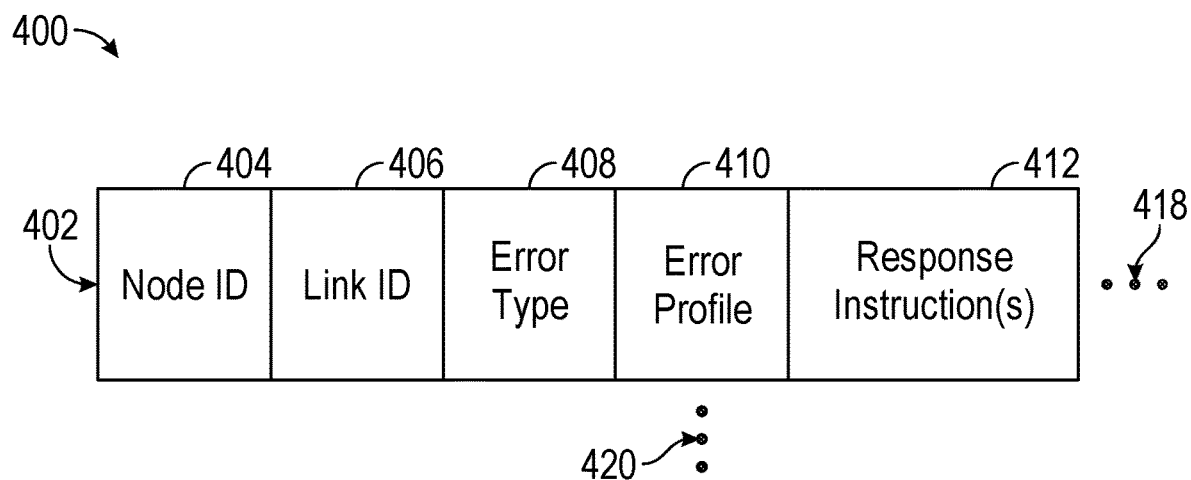
FIG. 4 is a block diagram of a data structure in accordance with aspects of the present disclosure.

An implementation of a data structure, data store, or database 400, which may store error profile and/or response information may be as shown in FIG. 4. The error profile data structure 400 may be the same or similar to the error profile data structure/databases 210 and/or 222. Each different type of error profile/response instruction may include a data structure 402. As there may be different types of errors 108 and response instructions for each node 106, link 110, and/or error type in error profile, there may be more or fewer error profile data structures 402 than that shown in FIG. 4, as represented by ellipses 420. Each data structure 402 can include one or more of, but is not limited to, a node Identifier (ID) 404, a link ID 406, an error type 408, an error profile 410, and/or one or more associated response instructions 412. Each data structure 402 can include more or fewer data portions or fields than those shown in FIG. 4, as represented by ellipses 418.

A node ID 404 can include any type of identifier, for example, a numeric identifier, an alphanumeric identifier, a Globally Unique Identifier (GUID), a network ID, a Uniform Resource Locator (URL), a Media Access Control (MAC) address, or other types of IDs. Regardless of the type of ID, the node ID 404 can uniquely identify a node 106 within the network 102.

The link ID 406 can identify the link 110 between a first node 106 and a second node 106. For example, node 106g may have link ID 406 for the path segment 110c between node 106g and node 106i. Thus, each link 110 between each node 106 may have a different identifier. The link ID 406 can include a numeric identifier, an alphanumeric identifier, a GUID, some other type of network identifier, or other types of IDs. Regardless of the type of ID, link ID 406 can uniquely identify a link 110 amongst other links from the node(s) 106 within the network 102.

The error type 408 can include any type of error 108 that might be seen or witnessed by the node 106. For example, the type 408 may include a data loss, a link loss, noisy data, or other types of errors 108 that affect the quality of signal between nodes 106. The error type 408 may generally characterize the error 108 witnessed by the node 106.

The error profile 410 can indicate or characterize what is being witnessed by the node 106, as initially defined by the error type 408. The error profile 410 can include what network parameters have been changed or have been affected, the amount of data loss, other information from other nodes, what type of signal or link loss was seen, and/or other types of information. This error profile 410 can characterize the error 108 in such a way that the node 106 can compare future errors 108 to this error profile 410 to determine whether the response instructions 412 associated with such error profile 410 may help to mitigate the current error 108.

Response instruction(s) 412 can include any type of subTrack or other types of responses to the error 108. For example, the response instruction 412 can indicate to the node 106 to use a different link 110, can indicate to the node 106 to copy the data onto one link 110 and continue to send data on another link 110 to another node 106. These response instructions 412 indicate what type of response the network 102 should take or configuration a network 102 should make to compensate for the error profile or error(s) seen in the error profile 410.

There can be two or more response instructions 412 or subTracks that can respond to an error profile 410. These different possible response instructions 412 may be provided together in the response instructions 412. Further, each different subTrack may have a different cost, based on the energy or spectrum used in the subTrack. The subTracks may then be ordered in the response instructions 412 based on the cost. In this way, the nodes 106 may choose the least costly subTrack to respond to the error profile 410. The costs of the subTracks can be updated periodically by the controller 104, and the controller 104 can update the order of the subTracks based on changes in the cost. These changes may necessitate the controller 104 to push a new data structure 402 to the nodes 106.

The response instruction 412 may be embodied in a portion of the header of a data packet or in another network instruction. For example, the response instruction 412, to switch to a subTrack, may be a bitmap of one or more bits that indicates the path to use for the data packet. A bitmap of "0001" may indicate the default Track, while a bitmap "0010" can indicate a first subTrack. There can be any number of subTracks for a set of nodes 106 based on the number of nodes 106, and likewise, the number of bits in the bitmap that represent the Tracks for the nodes 106 may vary. Each node 106 receiving the instruction can interpret the bitmap to determine how to forward packets of data. A single controller node, e.g., node 106a, may send these instructions to the other nodes, e.g., nodes 106b-106i, in the set of nodes that forward the particular data packets. In an implementation, the bitmap may be part of the SID in the IID of the data packet.

Other parts of the instruction can indicate how the data should be handled beyond where to forward the data. For example, a bit or set of bits may indicate a replication action to copy the data to a first node 106 while continuing to send the data to a second node 106. In other configurations, a bit may indicate a coalesced action to send the data only to a single other node 106. These instructions may be used by the node(s) 106 to respond to the errors 108 affecting the data transmissions.

Figure 3A:
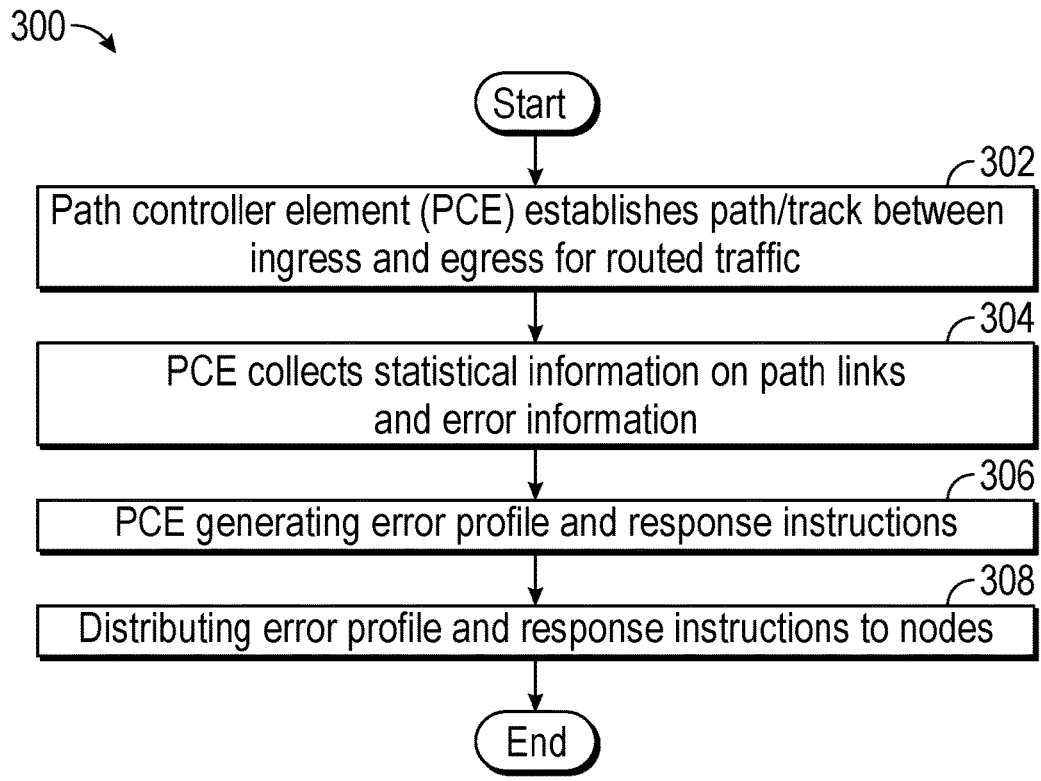
FIG. 3A is a flow chart of a method for a controller managing a network in accordance with aspects of the present disclosure.

An implementation of a method 300 for compensating for errors 108 within the network 102 may be as shown in FIG. 3A. The method 300 can start with a start operation and can end with an end operation. The method 300 can include more or fewer stages or can arrange the order of the stages differently than those shown in FIG. 3A. The method 300 can be executed as a set of computer-executable instructions, executed by a computer system or processing component, and be encoded or stored on a storage medium. Further, the method 300 can be executed by a gate or other hardware device or component in an ASIC, a FPGA, a SOC, or other type of hardware device. Hereinafter, the method 300 shall be explained with reference to the systems, components, modules, software, data structures, etc. described herein.

The PCE, e.g., the controller 104, can establish a Track between an ingress node, e.g., node 106a, and an egress node, e.g., node 106d, for routed traffic, in stage 302. The track configurer 214 can determine, for data received or sent from a client and at an ingress node 106a, a default or initial Track to an egress node 106d in communication with another client that is to receive the data. This initial Track can determine or assign the intermediary nodes 106b, 106g, and 106c and secondary or reserve nodes 106e, 106i, and 106f. This Track information may be provided to the one or more nodes 106a through 106i. Further, the Track information may then allow for these different nodes 106a through 106i to create the initial Track, as described in conjunction FIG. 1B.

After the nodes 106 configure the path or Track between the ingress node 106a and the egress node 106d, the PCE 104 can begin to collect statistical information on the path or Track and collect the error information, in stage 304. The statistical evaluator 216 may monitor links between the two or more nodes 106. The statistical information that may be collected from the nodes 106 can include, but is not limited to, what type of errors 108 are seen, the error types, the baseline QoS and data throughput, other types of information that may indicate how well the links are performing.

The statistical information may be stored, by the statistical evaluator 216, to generate one or more error profiles 410. The error profile/response generator 218, of the PCE 104, may then generate the error profiles 410 and the matched response instructions 412, in stage 306. Here, the statistical evaluator 216 can provide information to the error profile/response generator 218. The statistical information may then be used to create data structure(s) 402 that may associate error profiles 410 and response instructions 412. The statistical information can help populate the error type, the data loss information, the link loss information, the QoS of the signal, the degradation of QoS, the timing of the errors 108, what type of data was being sent, the link configuration(s), etc. Further, the statistical information can help define or characterize the error profile 410. For example, the error profile 410 can include what caused a data loss, a reduction in bandwidth, node failure, link failure, or other types of errors 108. The information for the error profile 410 and then the response instruction 412, including what type of sub-Track to use may then be stored in the data structure 402.

The node interface 220 may then distribute error profile 410 and response instructions 412 to the nodes 106, in stage 308. The data structure 402 may be provided to the one or more nodes 106 to be stored in the error profiles data structure 210. The node interface 220 may send one or more messages or a configuration over a link(s) 110 to the node(s) 106. In some implementations, separate data packets may be sent, over the communication network 102 to the one or more nodes 106 to store the error profiles 410 and response instructions 412. Further, the controller 104 can select a set (two or more) of the subTracks that can provide a maximum protection and can then push the selection of the subTrack to the nodes 106 along the Track to install in a FIB or use otherwise. In at least some implementations, the controller 104 can order, in the response instruction, two or more subTracks by cost terms of, for example, energy and spectrum. For a given observed error profile, a node 106 may select one of the two or more subTracks that has the least cost.

Figure 3B:
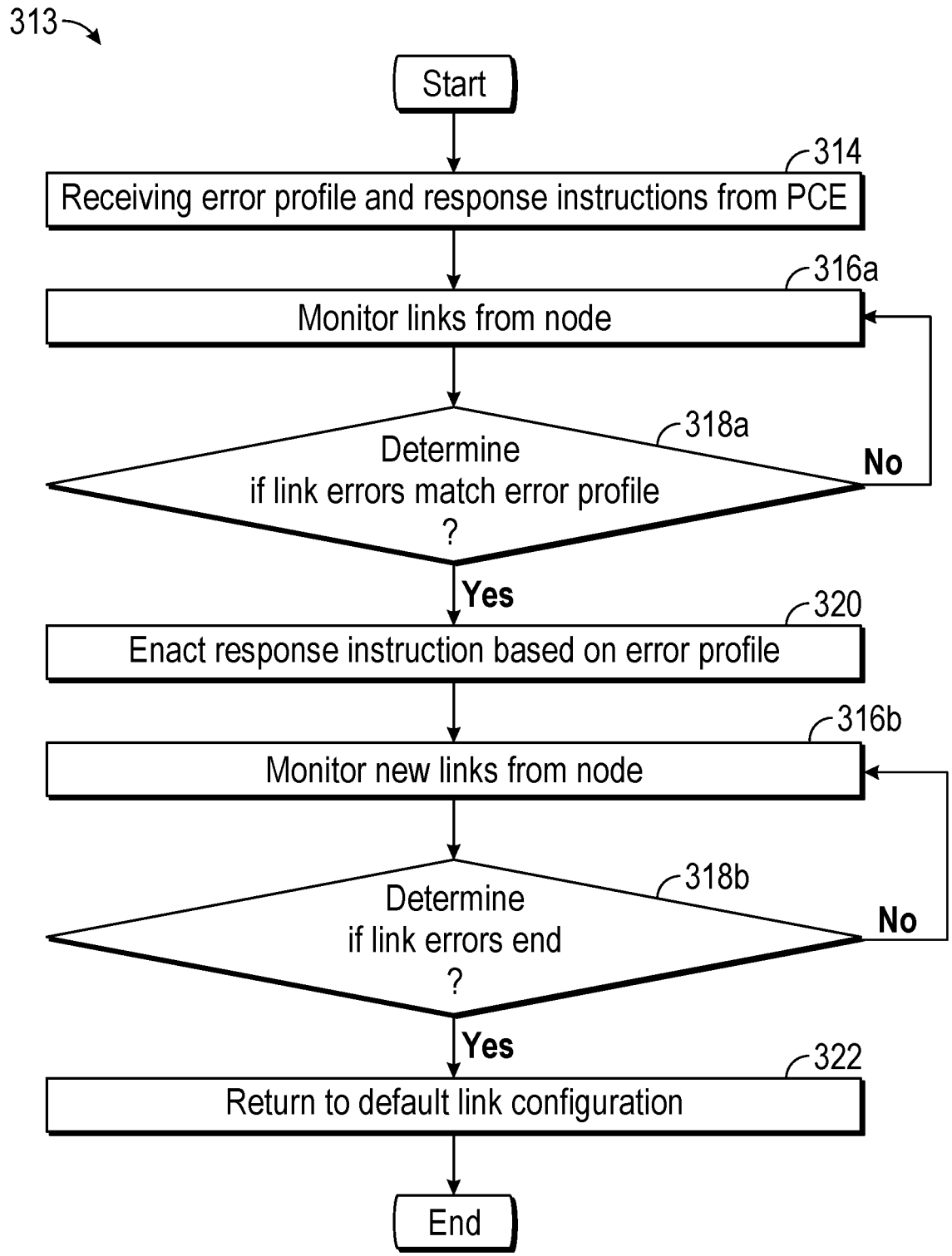
FIG. 3B is a flow chart of a method for a AP or other network device managing errors in a network in accordance with aspects of the present disclosure.

An implementation of a method 313 for compensating for errors 108 along a Track between an ingress node 106a and an egress node 106d may be as shown in FIG. 3B. The method 313 can start with a start operation and can end with an end operation. The method 313 can include more or fewer stages or can arrange the order of the stages differently than those shown in FIG. 3A. The method 313 can be executed as a set of computer-executable instructions, executed by a computer system or processing component, and be encoded or stored on a storage medium. Further, the method 313 can be executed by a gate or other hardware device or component in an ASIC, a FPGA, a SOC, or other type of hardware device. Hereinafter, the method 313 shall be explained with reference to the systems, components, modules, software, data structures, etc. described herein.

The nodes 106 may receive the error profile(s) 410 and response instructions 412, from the PCE 104, in stage 314. For example, the response determiner 206 may receive the error profile/response instructions 410/412 from the node interface 220 of the controller 104. The response determiner 206, or another component, can store such error/response information to the error profiles data store 210.

Each of the nodes 106a through 106i may then monitor the links 110, from each of the nodes 106 or to each of the nodes 106, for any type of errors 108 or other types of service degradation, in stage 316a. Each node 106 may determine if there are link errors 108. In an implementation, the error determiner 204 may send the error information to a controller node, e.g., the ingress node 106a. The ingress node 106a may then review all error information from the two or more nodes 106b-106i to determine if the error information may match or may be similar to, in a statistically significant way, error profile 410 stored in the error profile data structure 210, in stage 318a. Thus, the link monitor 202, of the ingress node 106a, can monitor the links 110, in stage 316a, of the nodes 106a-106i and can provide that information to the error determiner 204, of the ingress node 106a. The error determiner 204, of the ingress node 106a, then compares the different errors 108 that may be received, to the error profile 410 in data structure 400, as stored in error profiles database 210, at the node 106a. If the error determiner 204, of the ingress node 106a, determines that there is a link error 108, the method 313 may proceed "YES" to stage 320. However, if no link error 108 is recognized by the error determiner 204, of the ingress node 106a, the method 313 may proceed "NO" back to stage 316a, where the link monitor, of the ingress node 106a, continues to monitor links based on information from the other nodes 106b-106i.

In stage 320, the response determiner 206 and the link configurer 208, of the ingress node 106a, can determine and relay the response instructions 412, based on the error profile 410 and response instructions 412, in stage 320. Here, the link configurer 208, of the ingress node 106a can change the links 110 of one or more nodes 106a-106i. For example, the node 106g may be instructed to switch from the link 110 between node 106g and node 106c to link 110c to node 106i. This change can configure the subTrack from the main Track between the node 106a and node 106d. The instructions may be sent in a header of a data packet transmission, for example, as a bitmap in the SID of the IID.

For example, when using SRv6, a prefix may be associated to the destination of the Track. A controller node, e.g., the ingress node 106a, can encapsulate the packets in IP protocol packet and can set the destination address for the packet. The prefix, in the packet, designates the destination as per SRv6, e.g., "2001:db8:DE5::/48", and is advertised by that destination as an aggregation in the Interior Gateway Protocol (IGP). The next bits, in the destination, can indicate the Track. Multiple Tracks may lead to a same destination node 106 in the source routed mode, and the SID placed II can contain the subTrack bitmap. In a distributed mode as explained below, the SID may signal the error profile e.g., "2001:db8:DE5:5::/64", denotes locally significant Track ID 5 to node "2001:db8:DE5::/48", and "2001:db8:DE5:5::3" denotes subTrack 0011 in that Track when using source routing, from node 106a.

After making the change, the new link 110 may be monitored, in stage 316b. Thus, the link monitor 202, of the ingress node 106a, can then change to monitor the new path from the node 106a to 106d and may determine if there are any link errors 108 on the new link 110, in stage 318b. If there are no link errors 108, the method returns "NO" back to stage 316b. If there are more errors 108, response determiner 206, of the ingress node 106a, can determine to return to the default Track configuration, in stage 322. Here, the Track change may be to change back to the default links, such that the configuration is changed to the default or initial Track for the data.

In some implementations, rather than a central node, e.g., node 106a, doing the monitoring for the nodes 106a-106i, each node 106a-106i may monitor and control the links to and from the node 106 in a distributed implementation. Thus, the monitoring of the Track or subTrack is distributed to two or more nodes 106 in the network 102. Thus, each node 106 can receive information from the link monitor 202 of that node and determine the status of links from that node 106. If there is an error 108, the error determiner 204 of the node 106 can determine the error profile 410 that matches the information and provide the information to the response determiner 206 of that node 106. The response determiner 206 and the link configurer 208 can change the Track for that node 106. As such, the various subTracks are configured by each node 106, as each node 106 is making link decisions. This configuration is more intensive on the network 102, as each node 106 must make the calculations and configurations, and each node 106 stores an individual copy of the error profile data store 210. However, this arrangement may involve fewer administrative communications to establish the subTrack, if the controller node 106a is having to send such messages to the other nodes 106.

Figure 5A:
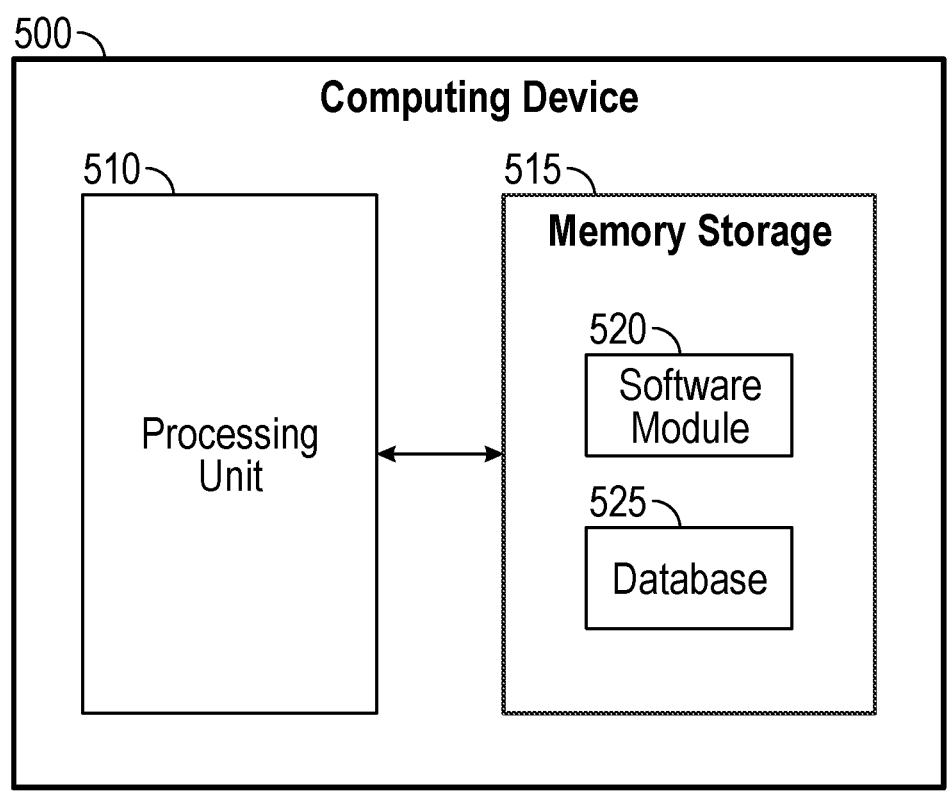
FIG. 5A is a block diagram of a computing device in accordance with aspects of the present disclosure.

FIG. 5A shows computing device 500. As shown in FIG. 5A, computing device 500 may include a processing unit 510 and a memory unit 515. Memory unit 515 may include a software module 520 and a database 525. While executing on processing unit 510, software module 520 may perform, for example, processes for providing reconfigured Tracks and subTracks based on error profiles as described above with respect to FIGS. 3A and 3B. Computing device 500, for example, may provide an operating environment for the controller 104, the nodes 106, or the other devices, however, the controller 104, nodes 106, and other devices may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Figure 5B:
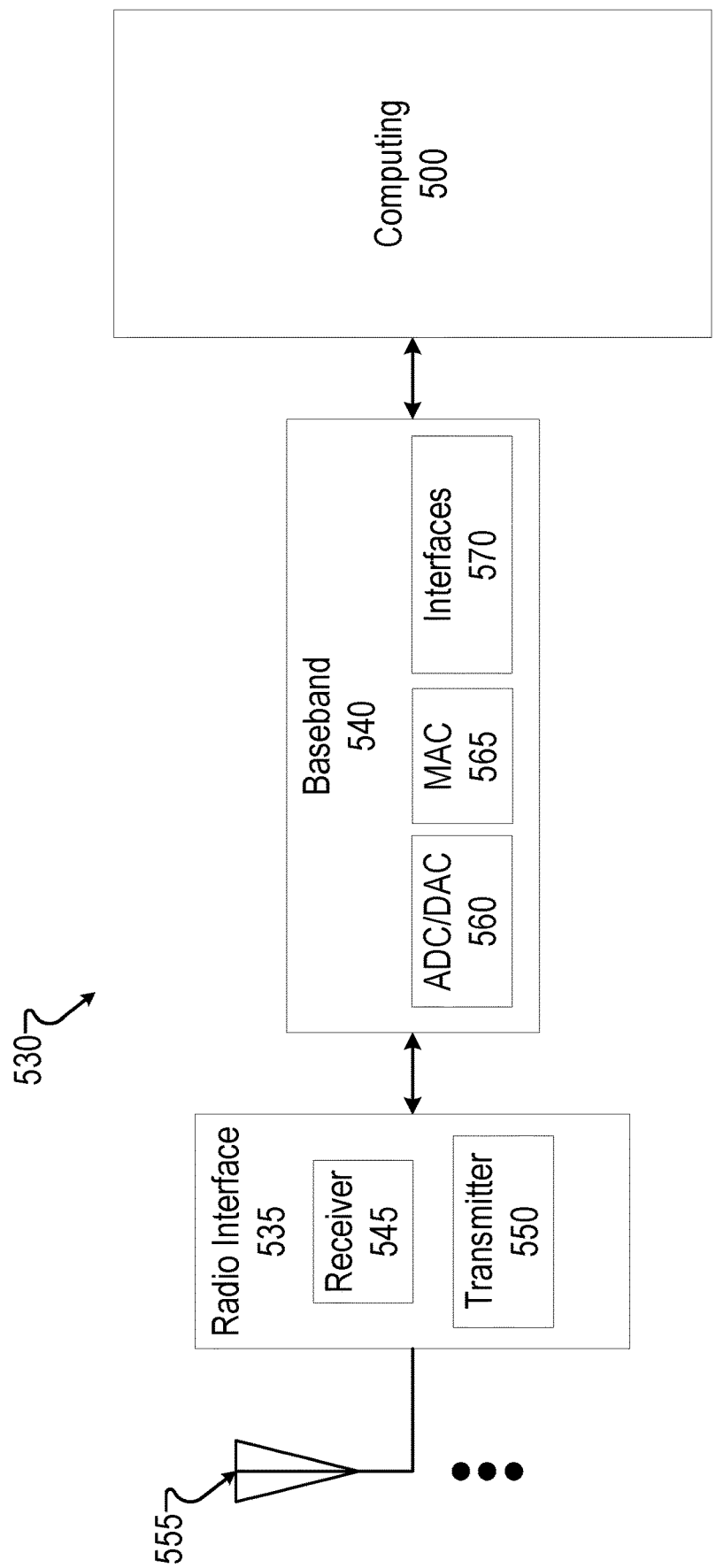
FIG. 5B is a block diagram of an AP or other networking device in accordance with aspects of the present disclosure.

FIG. 5B illustrates an implementation of a communications device 530 that may implement one or more of nodes 106, controllers 104, and/or client devices of FIG. 1. In various implementations, device 530 may comprise a logic circuit. The logic circuit may include physical circuits to perform operations described for one or more of nodes 106, controllers 104, and client devices of FIG. 1, for example. As shown in FIG. 5, device 530 may include one or more of, but is not limited to, a radio interface 535, baseband circuitry 540, and/or computing platform 500.

The device 530 may implement some or all of the structures and/or operations for one or more of nodes 106, controllers 104, and client devices of FIG. 1, storage medium, and logic circuit in a single computing entity, such as entirely within a single device. Alternatively, the device 530 may distribute portions of the structure and/or operations using a distributed system architecture, such as a client-server architecture, a peer-to-peer architecture, a master-slave architecture, etc.

A radio interface 535, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 535 may include, for example, a receiver 545 and/or a transmitter 550. Radio interface 535 may include bias controls, a crystal oscillator, and/or one or more antennas 555. In additional or alternative configurations, the radio interface 535 may use oscillators and/or one or more filters, as desired.

Baseband circuitry 540 may communicate with radio interface 535 to process, receive, and/or transmit signals and may include, for example, an Analog-To-Digital Converter (ADC) for down converting received signals with a Digital-To-Analog Converter (DAC) 560 for up converting signals for transmission. Further, baseband circuitry 540 may include a baseband or PHYsical layer (PHY) processing circuit for the PHY link layer processing of respective receive/transmit signals. Baseband circuitry 540 may include, for example, a Medium Access Control (MAC) processing circuit 565 for MAC/data link layer processing. Baseband circuitry 540 may include a memory controller for communicating with MAC processing circuit 565 and/or a computing platform 500, for example, via one or more interfaces 570.

In some configurations, PHY processing circuit may include a frame construction and/or detection module, in combination with additional circuitry such as a buffer memory, to construct and/or deconstruct communication frames. Alternatively or in addition, MAC processing circuit 565 may share processing for certain of these functions or perform these processes independent of PHY processing circuit. In some configurations, MAC and PHY processing may be integrated into a single circuit.

The methods and systems here have distinct advantages and allow for different types of improved services for client stations using the network 102. Addressing link/node errors 108 is easier and more effective as the network controller 104 need not address all the errors 108. Rather, the nodes in the network can address the errors 108 based on information preconfigured by the controller 104. In this way, the network topology can be modified in near real time to ensure the best service to the clients.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 500 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
receiving, at a network node, an error profile and a response instruction associated with the error profile wherein the response instruction directs the network node to either send all data to another node or to send the data to a first node and copy the data to a second node;
monitoring, by the network node, for an error on a communication Track, in a network, between an ingress node and an egress node;
upon detecting the error, determining, by the network node, that the error is similar to the error profile; and
based on the determination that the error is similar to the error profile, enacting, by the network node, the response instruction to switch from a first subTrack currently in use to a second subTrack between the ingress node and the egress node wherein the network node is a controller node that controls the communication Track for an ingress node, an egress node, and one or more intermediary nodes wherein the controller node sends the response instruction in a Security Identifier (SID) of a data packet sent to another node wherein the second subTrack is chosen based on a cost of the second subTrack.

2. The method of claim 1, wherein the communication Track comprises the ingress node, the egress node, and the one or more intermediary nodes between the ingress node and the egress node.

3. The method of claim 2, wherein the first subTrack includes a first intermediary node and the second subTrack includes a second intermediary node but not the first intermediary node.

4. The method of claim 3, wherein the network node is one of the ingress node, the egress node, or one of the intermediary nodes, and wherein the network node monitors and changes links only on the network node.

5. The method of claim 1, further comprising:
establishing, by a controller, the communication Track;
collecting, by the controller, statistical information about the network;
generating, by the controller, the error profile and the response instruction; and
distributing, by the controller, the error profile and the response instruction to the network node.

6. The method of claim 1, further comprising monitoring the second subTrack for errors.

7. A system comprising:
a memory; and
a processing unit coupled to the memory, wherein the processing unit is operative to:
receive an error profile and a response instruction associated with the error profile wherein the response instruction directs the network node to either send all data to another node or to send the data to a first node and copy the data to a second node;
monitor for an error on a communication Track, in a network, between an ingress node and an egress node;
upon detecting the error, determine that the error is similar to the error profile; and
based on the determination that the error is similar to the error profile, enact the response instruction to switch from a first subTrack currently in use to a second subTrack between the ingress node and the egress node wherein the network node is a controller node that controls the communication Track for an ingress node, an egress node, and one or more intermediary nodes wherein the controller node sends the response instruction in a Security Identifier (SID) of a data packet sent to another node wherein the second subTrack is chosen based on a cost of the second subTrack.

8. The system of claim 7, wherein the first subTrack includes a first intermediary node and the second subTrack includes a second intermediary node but not the first intermediary node.

9. The system of claim 7, wherein a network node is one of the ingress node, the egress node, or the one of one or more intermediary nodes, and wherein the network node monitors and changes links only on the network node.

10. The system of claim 9, wherein the network node is a controller node that controls the communication Track for the ingress node, the egress node, and the one or more intermediary nodes.

11. A non-transitory computer-readable medium that stores a set of instructions which when executed perform a method executed by the set of instructions comprising:
receiving, at a network node, an error profile and a response instruction associated with the error profile wherein the response instruction directs the network node to either send all data to another node or to send the data to a first node and copy the data to a second node;
monitoring, by the network node, for an error on a communication Track, in a network, between an ingress node and an egress node;
upon detecting the error, determining, by the network node, that the error is similar to the error profile; and
based on the determination that the error is similar to the error profile, enacting, by the network node, the response instruction to switch from a first subTrack to a second subTrack between the ingress node and the egress node wherein the network node is a controller node that controls the communication Track for an ingress node, an egress node, and one or more intermediary nodes wherein the controller node sends the response instruction in a Security Identifier (SID) of a data packet sent to another node wherein the second subTrack is chosen based on a cost of the second subTrack.

12. The non-transitory computer-readable medium of claim 11, wherein the communication Track comprises the ingress node, the egress node, and the two or more intermediary nodes between the ingress node and the egress node.

13. The non-transitory computer-readable medium of claim 11, further comprising:
establishing the communication Track;
collecting statistical information about the network;
generating the error profile and the response instruction; and
distributing the error profile and the response instruction to the network node.

* * * * *